Sept. 4, 1934.  M. ROMAINE ET AL  1,972,818
MILLING MACHINE
Filed Oct. 26, 1931  5 Sheets-Sheet 4
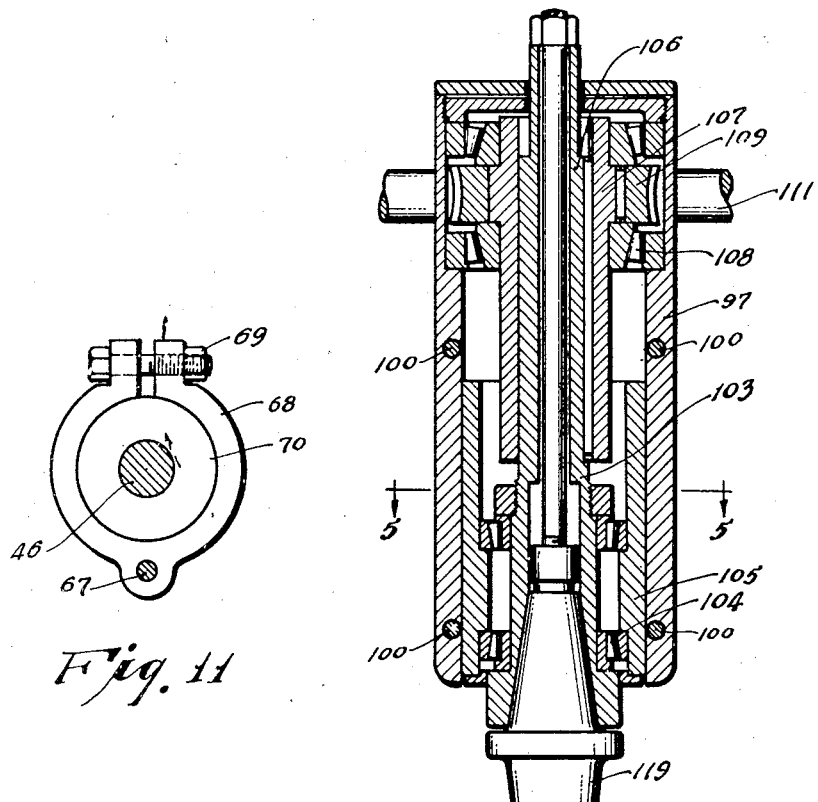
Fig. 11
Fig. 4
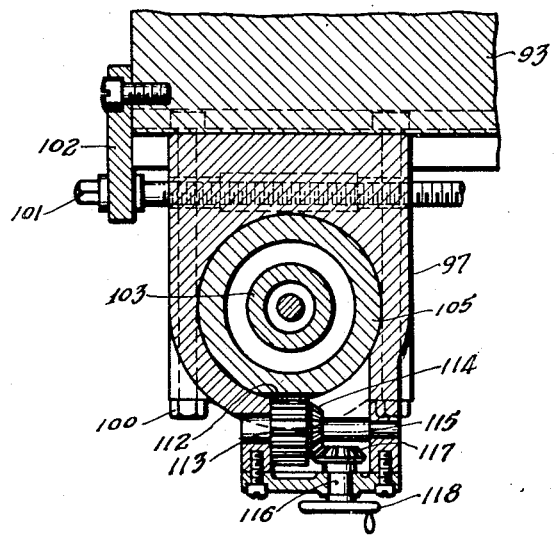
Fig. 5
Inventor
MILLARD ROMAINE
ERWIN G. ROEHM
By
*H. H. Parsons*
Attorney Sept. 4, 1934.  M. ROMAINE ET AL  1,972,818
MILLING MACHINE
Filed Oct. 26, 1931   5 Sheets-Sheet 5

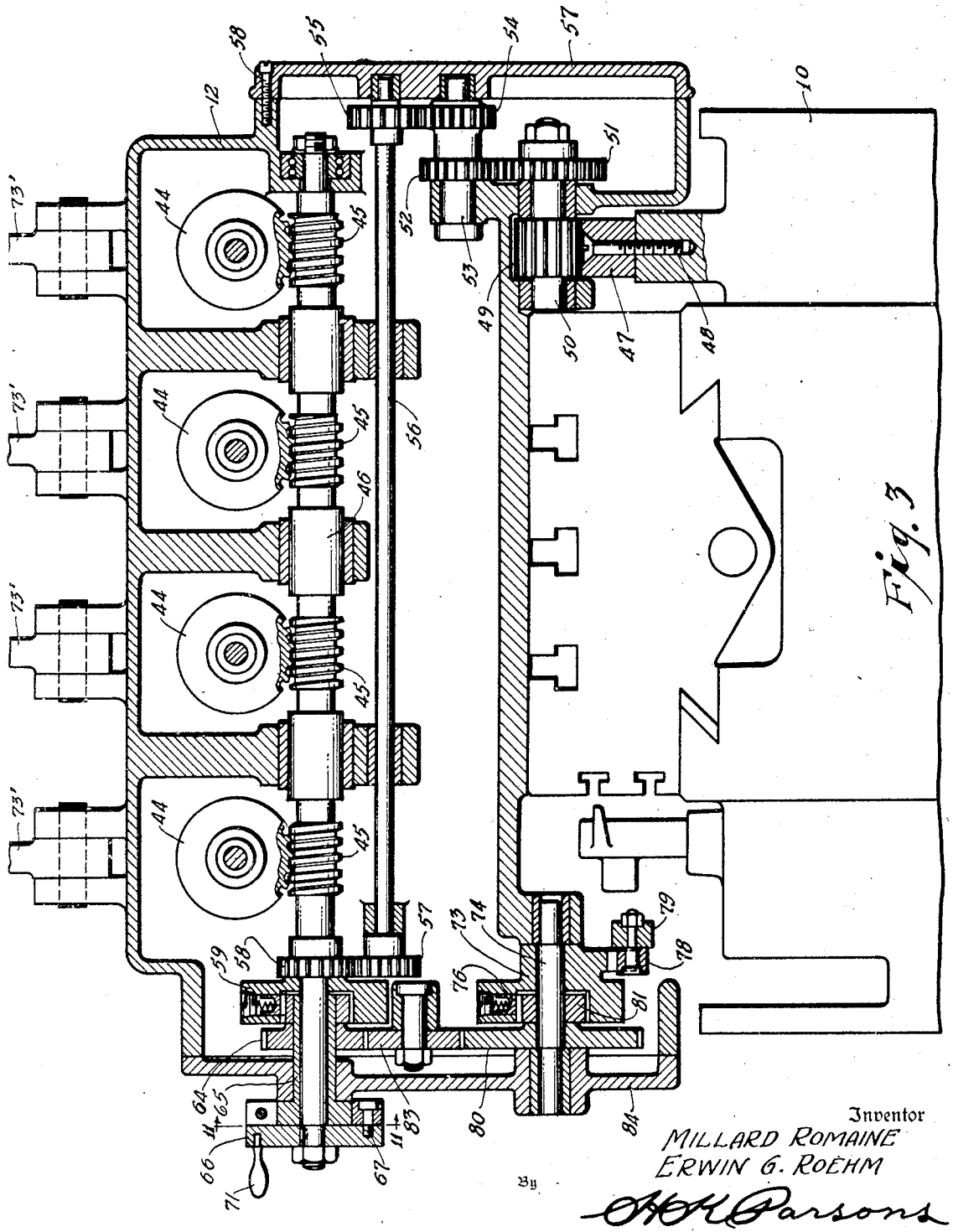

Inventor
MILLARD ROMAINE
ERWIN G. ROEHM

Attorney

Patented Sept. 4, 1934

1,972,818

UNITED STATES PATENT OFFICE 1,972,818

MILLING MACHINE

Millard Romaine, Cincinnati, and Erwin G. Roehm, Norwood, Ohio, assignors to The Cincinnati Milling Machine Company, Cincinnati, Ohio, a corporation of Ohio Application October 26, 1931, Serial No. 571,040

20 Claims. (Cl. 90—19)

This invention relates to milling machines and more particularly to an improved machine for milling the flutes of twist drills and the like.

One of the principal objects of this invention is to provide an improved milling machine for performing multiple flute cutting operations and the like which has greater flexibility of adjustment between cutters and work than prior structures whereby each cutter may be individually adjusted relative to its respective work piece but with all cutters subject to joint control during operation of the machine.

Another object of this invention is to provide an improved mounting for a plurality of cutter spindles which will rigidly support the attached cutters in predetermined positions relative to the work in such a manner as to eliminate vibration and chatter thereof, thereby increasing the accuracy of individual work pieces as well as obtaining greater uniformity in the work produced by the several cutters.

A further object of this invention is to provide in an hydraulically operated milling machine an improved mechanism for jointly advancing and retracting automatically a plurality of cutter spindles relative to their respective work pieces at predetermined points in the cycle of power movement of the work relative to the cutters.

A still further object of this invention is to provide improved mechanism in a drill flute milling machine for imparting a constant lead or rotation to the work during the cutting operation and for indexing the work at the end of each cycle of the machine.

An additional object of this invention is to provide an improved hydraulically actuated machine for milling preformed flutes in straight or tapered shank drills and the like.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings in which like reference numerals indicate like or similar parts:

Figure 3 is a section on the line 3—3 of Figure 1.

Figure 4 is a section through the spindle as viewed on the line 4—4 of Figure 1.

Figure 5 is a section on the line 5—5 of Figure 4.

Figure 11 is a detail view on the line 11—11 of Figure 3.

The machine in general comprises a bed 10 having a table 11 reciprocably mounted thereon which carries a spiral milling head 12 for relative movement with respect to a plurality of cutters 13. The cutters are supported by an overhead structure at an angle to the axis of the work mounted in the milling head. Mechanism is provided for reciprocating the table and thereby the work relative to the cutters and simultaneously rotating the work during reciprocation to thereby cut a spiral groove or flute in the work. After each reciprocation the work is returned and indexed in preparation for the cutting of a second flute.

Figure 1:
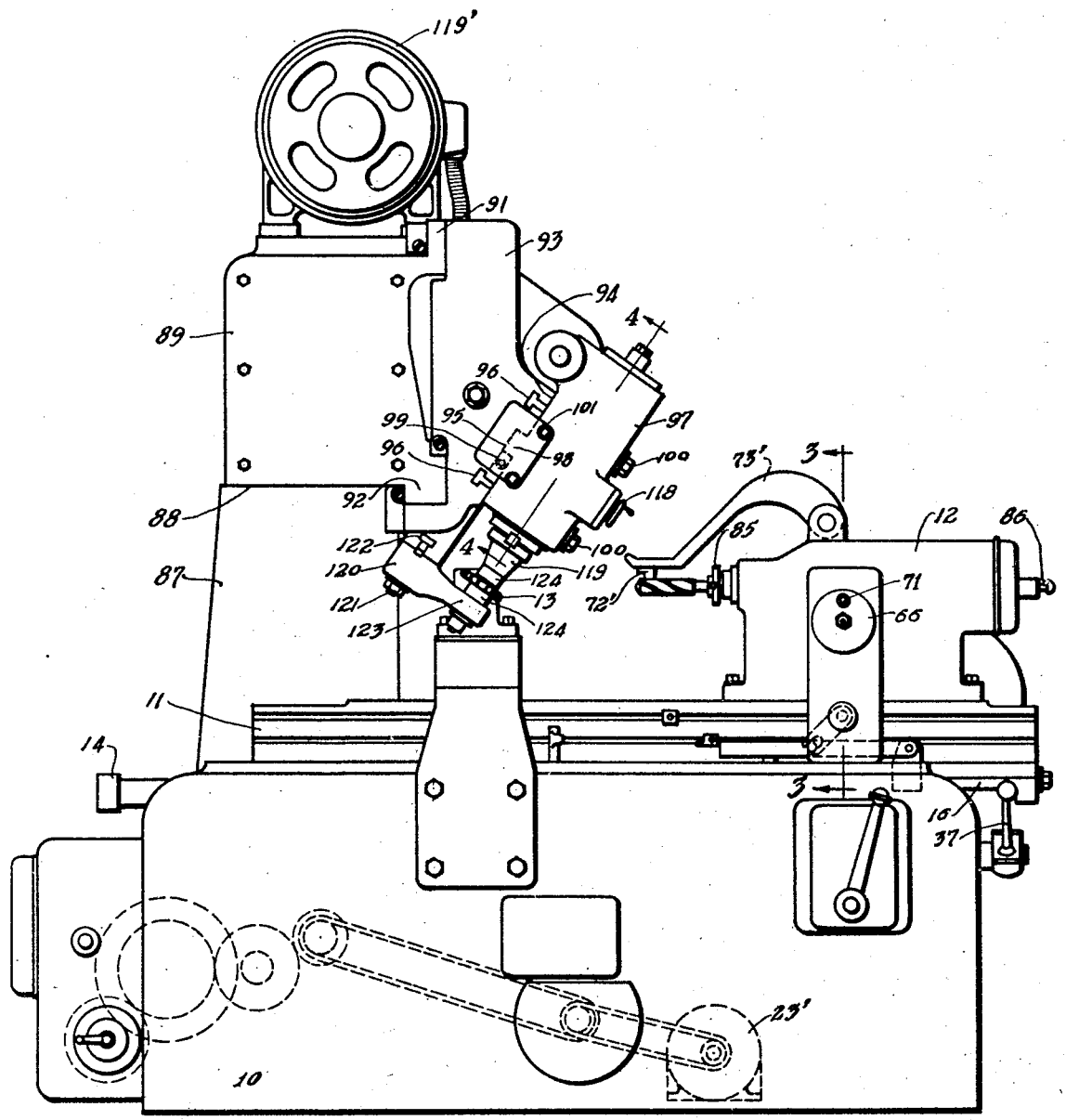
Figure 1 is an elevation of a machine illustrating one embodiment of the invention.
Figure 10:
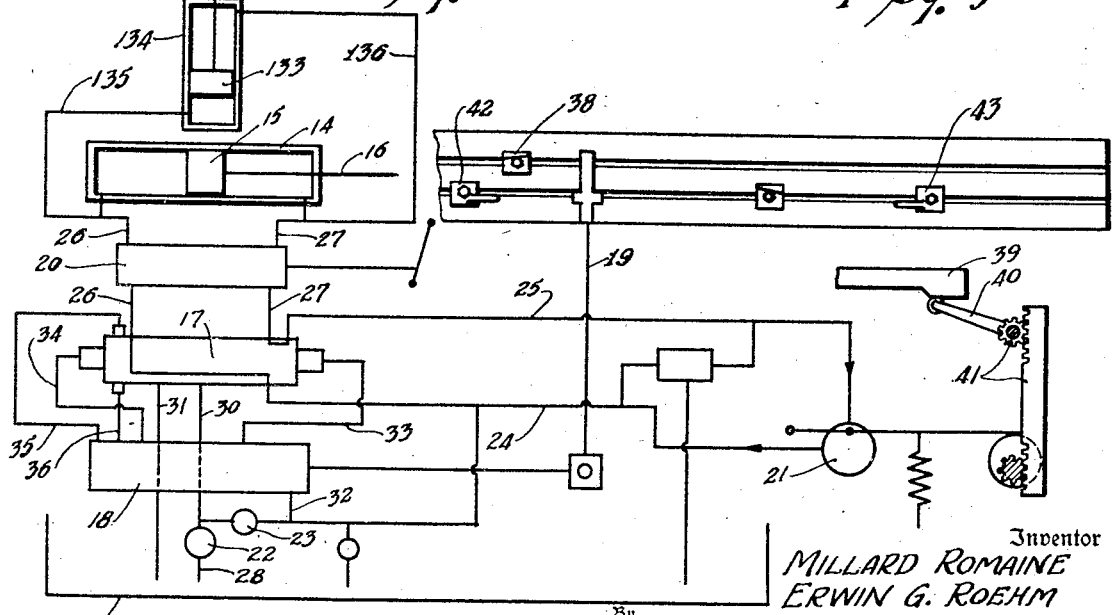
Figure 10 is a diagrammatic view of the hydraulic circuit.

The table is preferably reciprocated by hydraulic means, the circuit of which is illustrated in Figure 10. Since this circuit is a known hydraulic circuit and constitutes no part of the present invention, it will only be briefly described. The reference numeral 14 indicates a cylinder which may be mounted in the bed having a piston 15 reciprocably mounted therein which is attached to the bed by means of a piston rod 16. A selector valve 17 is provided for determining the rate and direction of movement of the table and is automatically shifted by power under the control of a pilot valve 18 and a trip controlled plunger 19. A stop valve 20 is interposed between the selector valve and the cylinder for stopping the table at any point in its cycle. A plurality of pumps including a variable delivery pump 21, a rapid traverse pump 22 and a booster pump 23 are provided for supplying the system with fluid pressure. These pumps are constantly rotated by an electric motor 23' through suitable transmission as shown in Figure 1. The variable delivery pump 21 is connected to the selector valve by means of pressure channel 24 and return channel 25. Conduits 26 and 27 are coupled to the selector valve and respectively to opposite ends of the cylinder having interposed therein the stop valve 20.

The selector valve is adapted to be rotated to determine the coupling between the lines 24, 25 and the conduits 26, 27 to determine the direction of feeding movement of the table. The rapid traverse pump 22 has an intake 28 through which fluid is drawn from the reservoir 29 and a pressure channel 30 through which fluid is conducted to the selector valve. A return channel 31 extends from the selector valve to the reservoir and during feed movements of the table is coupled by the selector valve to the channel 30 to thereby short circuit the rapid traverse pump. Rotation of the selector valve will short circuit the lines 24, 25 from the variable delivery feed pump and simultaneously couple the channels 30, 31 with the conduits 26, 27 to effect movement of the table at a rapid traverse rate.

The pilot valve 18 is supplied with pressure from the booster pump 23 through channel 32 and distributes the fluid under control of the trip plunger 19 to selector channels 33, 34, 35 and 36, these channels being arranged in pairs so that upon admission of pressure to one, the opposite channel is connected to reservoir. For instance, if pressure is admitted to channel 33, channel 34 will be connected to reservoir and the selector valve will be shifted longitudinally to the left while if the reverse connections are made, the valve will be shifted to the right. This will determine the direction of movement of the table. Similarly if pressure is admitted to the channel 35, the channel 36 will be connected to reservoir while if the reverse connections are made, channel 36 will be under pressure and channel 35 connected to reservoir. This will rotate the valve either clockwise or counter-clockwise to determine the rate of movement of the table.

At the beginning of a machine cycle the table will be in an extreme right hand or starting position and the control plunger 19 will be in a counter-clockwise rotated position and in a vertically lowered position. The manner of coupling the plunger to the pilot valve is more fully explained in co-pending application of Hans Ernst, et al., Serial Number 343,486 filed February 28, 1929 and therefore further explanation thereof is not believed to be necessary herein. The pilot valve 18 will then be in such a position as to power shift the selector valve to a stop position or in other words to a position that will short circuit the pair of lines 24, 25 and also the pair of lines 30, 31. Upon vertical upward movement of the plunger 19 by means of a manual control lever 37 shown on the end of the machine, Figure 1, the pilot valve will be rotated to move the selector valve to a rapid traverse position starting the table. Continued movement of the table to the right will cause a dog 38 carried thereby to depress the plunger 19 thereby moving the selector valve to effect a coupling of channels 24, 25 with channels 26, 27, respectively changing the rapid traverse movement of the table to a feed movement. During the feeding movement the variable delivery pump 21 is under the control of a cam 39 carried by the table operating through a crank 40 and rack-and-gear mechanism 41 to vary the displacement of the pump and thereby control or vary the feed rate. At the completion of the feeding movement, a reverse dog 43 will effect rotation of the plunger 19 which through the pilot valve will effect a shifting of the selector valve to couple the rapid traverse pump with the cylinder 14 to cause return movement of the table at a rapid traverse rate. A second dog 42 will then engage the control plunger which will act on the pilot valve to cause shifting of the selector valve to a stop position. It should therefore be apparent that the table may be reciprocated at feed and rapid traverse rates by hydraulic means under trip control and that the feed rate may be automatically varied or controlled by cam means.

The spiral milling head 12 which is mounted on the table is provided with a plurality of work receiving chucks or spindles, the number of which may be varied to suit the requirements of the work or the machine. Each of these spindles is provided with a worm gear 44 on one end, Figure 3, which meshes with a worm 45 formed integral with a horizontal shaft 46 which is journaled in the housing 12 at right angles to the spindles. The following mechanism is provided for imparting a constant rotation or lead to the spindles and thereby the work during one reciprocation of the table. As more particularly shown in Figure 3, a rack 47 is fixed to the bed 10 by suitable means, such as screws 48. A gear 49 is keyed to a stud shaft 50 journaled in the housing 12 and movable therewith relative to the rack, which will thereby impart rotation to the gear. A change gear 51 is keyed to the end of the shaft 50 in mesh with a second change gear 52 mounted upon shaft 53 which is journaled in the housing. The gear 52 may be formed integral with a second gear 54 meshing with gear 55 keyed to the end of a horizontal shaft 56. The gears 51, 52, 54 and 55 constitute change gears and other pairs may be substituted therefor or these gears may be reversed in relation to the shafts to change the lead or spiral of the flute in the work piece. To permit easy access to these gears a removable cover plate 57 is secured to the end of the housing as by screws 58.

Figure 6:
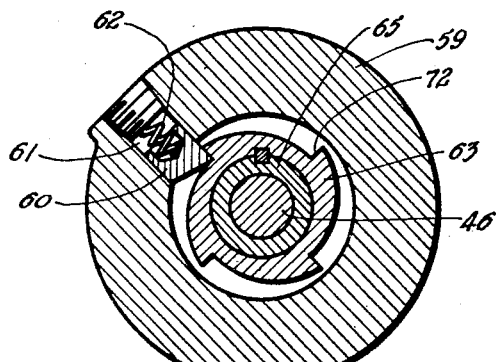
Figures 6 and 7 show details of the ratchet connection between the spindle drive shaft and the spindle rotating mechanism.
Figure 7:
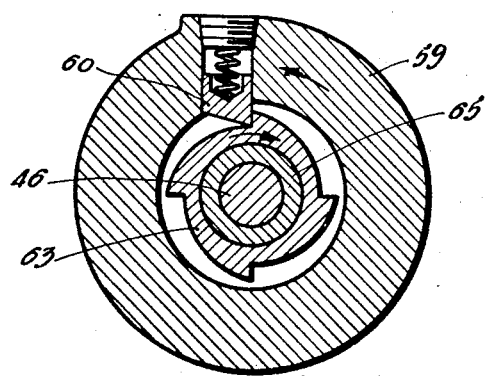

The shaft 56 extends transversely of the housing and is provided on the other end with a gear 57' which meshes with a gear 58 mounted for free rotation on the work spindle drive shaft 46. The gear 58 has integrally formed therewith an annular member 59 carrying a spring pressed pawl 60 shown more particularly in Figures 6 and 7. The pawl 60 is reciprocably mounted in a bore 61 formed in the member 59 in which is mounted a spring 62 for constantly urging the pawl 60 radially inward. A ratchet 63 formed integral with a gear 64 is keyed to a sleeve 65 mounted for free rotation relative to the shaft 46 and so positioned as to be engaged by the pawl 60. From Figure 6 it will be seen that clockwise rotation of the member 59 will effect clockwise rotation of the member 63 as well as the gear and sleeve coupled therewith.

Means have been provided for detachably connecting the sleeve 65 with the shaft 46 and as more particularly shown in Figures 3 and 11 comprises a disc 66 keyed to the end of shaft 46 and having connected therewith, as by means of a bolt 67, a split or contractible ring 68 and an adjusting bolt 69 by means of which the ends of the split ring may be drawn together. A friction plate 70 is secured to the end of the sleeve 65 around which the ring 68 is mounted. A handle 71 is connected to the plate 66 so that upon loosening of the clamp bolt 69 the shaft 46 may be manually rotated independent of sleeve 65 to adjust the work holding spindles. After manually positioning the spindles so that the work is properly oriented with respect to the cutters, the bolt 69 may be tightened to secure the sleeve 65 in operative engagement with the shaft 46.

It may here be stated that some tapered shank drills usually have the ends milled upon opposite sides to form a rectangular portion which fits a socket in the chuck and orients subsequent work carrier and two mounted upon the other end to save space and prevent interference.

As more particularly shown in Figure 4, each carrier is further provided with a spindle 103 which is journaled at one end in anti-friction bearings 104 mounted in a quill 105 and at the other end is provided with a splined shank 106 which is guided by a sleeve 107 journaled in anti-friction bearings 108 carried by the spindle carrier housing 97. The sleeve 107 has keyed to one end a spiral worm gear 109, meshing with a spiral worm 110 splined on a horizontal driving shaft 111.

The quill 105 is reciprocably mounted in the spindle housing for effecting axial adjustment of the spindle and the cutter carried thereby. To this end the quill has rack teeth 112 formed therein as shown in Figure 5 which mesh with a pinion 113 having a bevel gear 114 formed coaxially therewith. These gears are mounted on a shaft 115 which is journaled in the carrier at right angles to a stud shaft 116 which has a bevel gear 117 on one end in mesh with the bevel gear 114 and an operating hand wheel 118 secured to the other end on the outside of the housing. Rotation of the hand wheel in one direction or the other will thus effect axial adjustment of the quill and its contained spindle. A cutter arbor 119 is mounted in the end of the spindle upon which a cutter 13 is mounted. In order to more rigidly support the cutter, an arbor support 120 is bolted to the underside of the saddle by means of clamping bolts 121 mounted in T-slots 122 formed in the underside of the saddle. The arbor supports are adjustable with the spindle carrier relative to the saddle. Each arbor support has a bearing 123 in the outer end for receiving the end of an arbor, and the cutter may be spaced at any position along the arbor, depending upon the height of the work, by means of spacing bushings 124. This forms a very rigid and compact cutter supporting structure. It will now be evident that each cutter is individually adjustable both laterally and longitudinally, independent of the remaining cutters and it is therefore possible to use different diameter cutters but of the same peripheral profile. This facilitates setting up the machine and eliminates the necessity of grinding the cutters in gangs as well as reducing the amount of skill necessary to set up the machine.

The cutter spindle driving shaft 111 is actuated from a prime mover 119' which is mounted upon the top of the rail 89 through change speed gearing. To this end a gear 120' is mounted on a shaft 121' for rotation by gear 122' through suitable chain or belt drive 123'. Also on the shaft 121' is a change gear 124' meshing with a change gear 125 secured to the end of the shaft 111. These change gears may be reversed or other suitable gears substituted whereby different rates of rotation may be imparted to the shaft 111 and thereby the cutters 13. A removable cover 126 is mounted on the end of the gear box 127 to permit easy access to effect these speed changes. The cutter spindles may thus be selectively rotated at different speeds.

Figure 2:
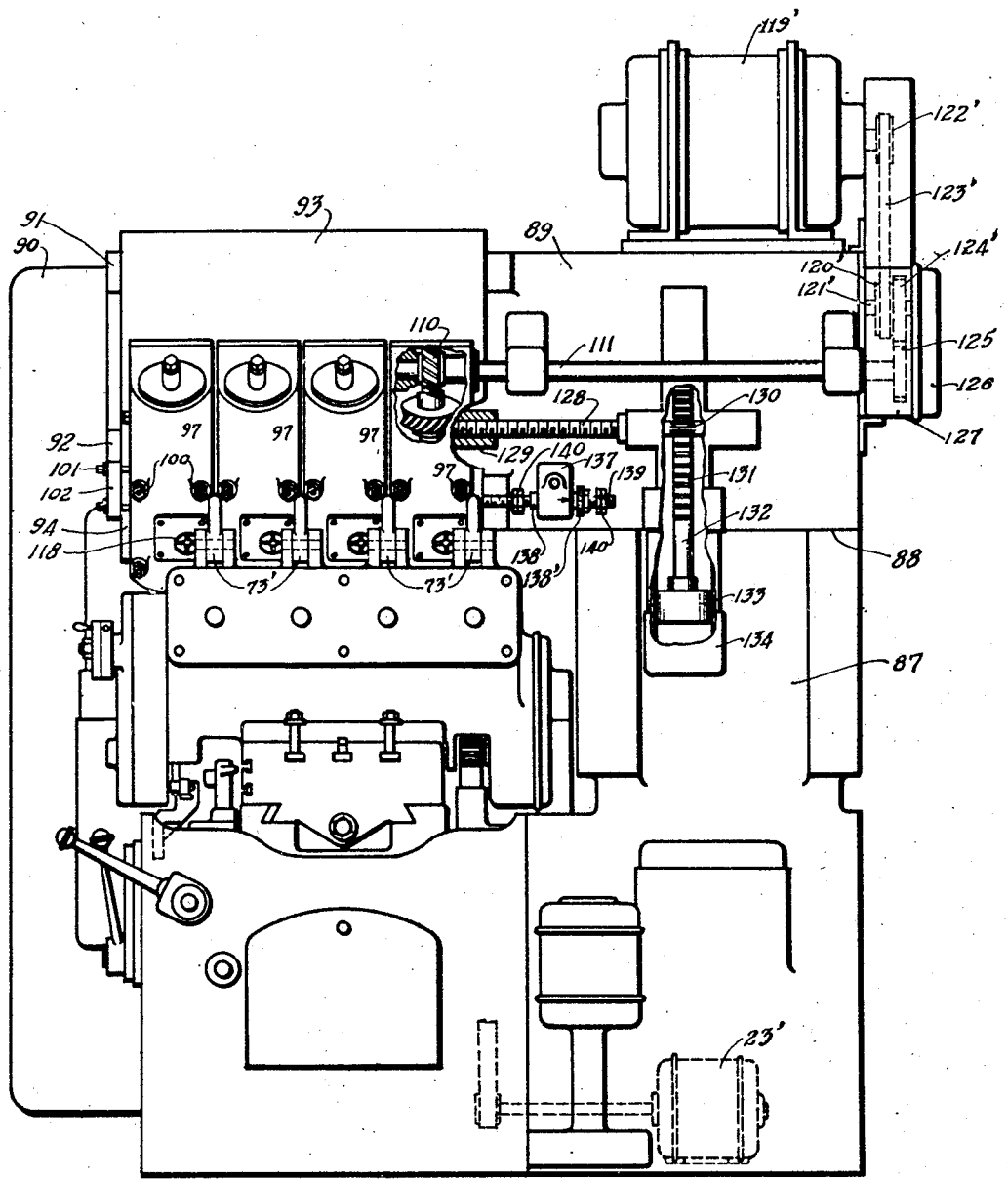
Figure 2 is an end elevation of the machine shown in Figure 1.

After the cutters have been laterally and axially adjusted relative to the work and securely fixed in position on the saddle, it is necessary to provide means for reciprocating the saddle to advance and retract the cutters relative to the work. To this end a lead screw 128 is journaled in the rail in engagement with a nut 129 fixed to the saddle. The other end of the screw is provided with a pinion 130 meshing with a rack 131 formed on the piston rod 132 connected to a piston 133 reciprocably mounted in a cylinder 134 attached to the side of the column. As illustrated in Figure 10 the cylinder 134 is connected to the channels 26 and 27 leading to the table actuating cylinder 14. The lower end of the cylinder is connected by means of channel 135 with channel 26 and the upper end of the cylinder is connected by channel 136 with channel 27. The effect of this is that when pressure flows in channel 27 to cause movement of the table to the left that hydraulic pressure will also flow to the upper end of the cylinder 134 causing the piston 133 to move downward thereby rotating the screw 128 and causing the saddle 93 to move toward the right as viewed in Figure 2 thereby moving the cutters into their cutting position. Upon reversal of the flow in the channels 26 and 27 to effect return movement of the table, the pressure will flow in the channel 135 causing upward movement of the piston 133 and movement of the saddle to the left thereby retracting the cutters from the work. It will be noted that the table and work are heavier than the cutters, offering greater resistance to movement and thereby it is possible to directly couple the two operating cylinders in this manner as the pressure in the cylinder 134 will build up to a maximum and thereby insure retraction of the cutters at the moment of reversal of the table and before the table actually begins its return movement.

Positive means have been provided for determining the depth of cut to be made by the cutters and also for limiting the retracting movement. A boss 137 is formed integral with the rail 89 and has a threaded bore for receiving a sleeve 138 provided with a head 138' upon one end upon which are marked graduations cooperating with a pointer fixed with the boss. A threaded rod 139 secured to the saddle extends freely through the sleeve and is provided with lock nuts 140 upon opposite ends thereof. These lock nuts may be adjusted for limiting the movement of the saddle in opposite directions.

A milling machine has thus been provided for milling spiral flute drills, which has a very rigid and compact cutter supporting structure whereby the cutters are free from vibration thereby eliminating chatter; and in which the cutters are mounted for independent adjustment in two directions relative to the work permitting quicker and more accurate set-ups to be made; and in which the cutters are so mounted as to be automatically advanced and retracted jointly in accordance with the movements of an hydraulically actuated table.

That which is claimed is:

1. A milling machine having a bed, a table reciprocably mounted upon the bed, a column, a fixed rail projecting from the column, a saddle movably mounted upon the rail, a plurality of cutter spindles having attached cutters mounted upon the saddle for individual adjustment relative to the work carried by the table and to determine the depth of cut to be made by each individual cutter and means to move the saddle transversely of the table to effect simultaneous movement of all the cutters to a cutting position.

2. A milling machine having a bed, a table reciprocably mounted upon the bed, a column, a fixed rail projecting horizontally from the column, a saddle movably mounted upon the rail, a plurality of cutter spindles mounted on the saddle for joint movement relative to the table and pieces after the chuck has been manually adjusted as just described to orient the end of the preformed flute in the first work piece in proper relation to the cutter which may be accomplished by means of a guide strip 72' secured to the end of a pivoted arm 73'. The arm may be thrown back out of the way upon the top of the housing 12. Straight shank drills however have no flats on the end and each piece will therefore have to be oriented in the chuck by the guide strip.

It should now be apparent that movement of the table toward the cutters will cause counter-clockwise rotation of the gear 49 as viewed from the front of the machine thereby causing clockwise rotation of the member 59 which by means of the pawl 60 will cause clockwise rotation of the shaft 46 and a continuous rotation of the work heads. Upon return movement of the table the gear 49 will be rotated in the opposite direction or in other words in a clockwise direction by the rack 47 thereby causing a counter-clockwise rotation of the member 59 which will cause the pawl 60 to ride over the notches 72 of the ratchet member 63. In this manner the work spindles are disconnected from the rotating mechanism permitting an indexing mechanism described hereafter to function without interference.

The indexing is accomplished by means of a Geneva mechanism comprising the rotatable member 73 mounted for free rotation on shaft 74 journaled in the housing 12. This member has reciprocably mounted in a radial bore 75 thereof, a spring pressed pawl 76. The member 73 is also provided with a radial slot 77 for engaging a roller 78 on the end of a fixed bar 79. Since the bar 79 is fixed and the member 73 is longitudinally movable with the table, it will be apparent that upon movement in one direction, the member 73 will be rotated in a counter-clockwise direction and upon movement in the other direction will be rotated in a clockwise direction. In this manner the pawl 76 is oscillated with each reciprocation of the table.

Figure 8:
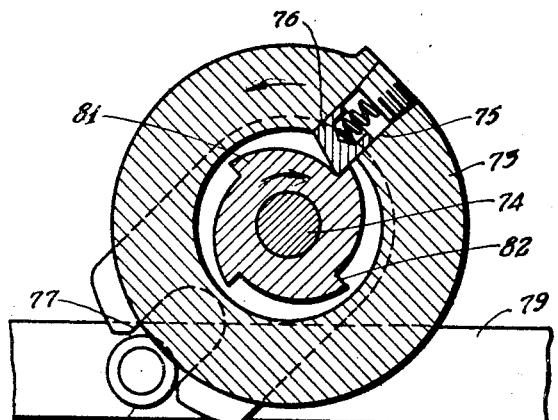
Figures 8 and 9 show details of the index ratchet on the Geneva shaft.
Figure 9:
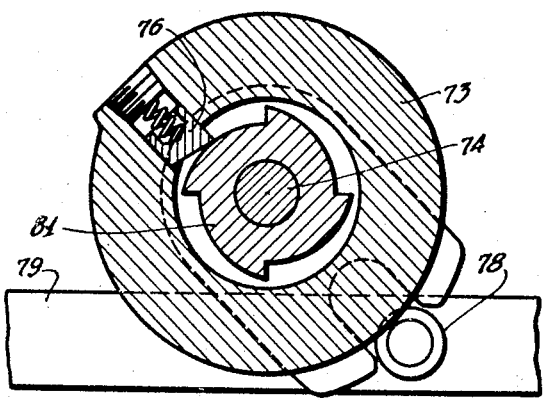

A gear 80 is mounted for free rotation on the shaft 74 and provided with a hub portion 81 around the periphery of which is formed a plurality of notches or teeth 82 for engagement by the pawl 76. The gear 80 is connected through an idler gear 83 with the gear 64 which, as previously mentioned, is operatively connected with the shaft 46. Upon forward movement of the table, the shaft 74 will move bodily to the left, as viewed in Figure 8, causing the roller 78 to engage the radial slot 77 and effect counter-clockwise rotation of the member 73 whereby the pawl 76 will be oscillated to engage the next preceding notch. During this forward movement of the table, it will be recalled that the gear 64 is rotating in a clockwise direction which, through the idler 83, will rotate the gear 80 and thereby the member 81 in a clockwise direction. It will thus be seen that the directions of rotation of the member 73 and the member 83, as indicated by the arrows in Figure 8, are such that one will move by the other without interference and that the work supporting spindles will be given a constant rotation during forward movement of the table.

Upon return movement of the table the roller 78 will engage the slot 77 to cause clockwise rotation of the member 73 and thereby through the pawl 76 will also cause clockwise rotation of the member 81. This will rotate the gear 80 in a clockwise direction which, through the idler 83, will cause rotation of the gear 64 in a clockwise rotation, and thereby the shaft 46, and this motion will take place independent of the pawl 60, because as shown by the arrows in Figure 7, the pawl 60 and member 59 will now be rotating in a counter-clockwise direction due to the return movement of the table while the sleeve and ratchet will be rotating clockwise. This will permit the work spindles to be indexed independent of and without interference from the rotating mechanism. It is thus obvious that upon reciprocation of the table toward the cutter that the work will be given a constant rotation and upon return movement of the table the work will be given an indexing movement which may be any number of degrees desired.

The amount of the indexing movement may be varied by changing the gears 64 and 80 which constitute change gears and for this purpose a removable cover plate 84 is secured to the end of the housing 12. Also due to the detachable connection between the sleeve 65 and the shaft 46 it will be apparent that the spindles may be rotatably adjusted independent of the power actuating mechanism.

Each spindle is provided at one end with a suitable work receiving chuck 85 and also a reciprocable plunger 86 by means of which the work may be pushed out of the chuck if there is any sticking or binding between them.

A column 87 is formed integral with the bed and provided with a flat top 88 upon which a horizontal rail 89 is mounted, the rail projecting over the table and provided with an outboard brace 90 secured to the opposite side of the bed. The rail 89 is provided with guideways 91 and 92 for receiving a saddle 93 which carries a plurality of spindle carriers. The spindle carriers will correspond in number to the number of work chucks which will vary according to the number of work pieces it is desired to finish in one operation of the machine and in accordance with the limitations and the size of the machine itself.

Since in the present instance the machine is being utilized for spiral milling, the axis of the spindle carriers are inclined to the plane of the table and it is apparent that this angle may be varied, or if desired the cutter spindles could be mounted thereon in perpendicular relationship to the table if the work required it. In any event the saddle is provided with a spindle carrier bearing surface 94 in which is formed a central guideway 95 and T-slots 96 on opposite sides thereof. These various elements extend longitudinally of the saddle or in other words transversely to the direction of table movement. The spindle carriers 97 are provided with a guide 98 interfitting with the guideway 95 which has a gib 99 to take up any looseness. Clamping bolts 100 are mounted in the T-slots and extend through the carriers for securing the carrier against the guide surface after adjustment. Each carrier is individually adjustable longitudinally of the saddle and this permits each cutter to be set independent of the remaining cutters, the advantage being that the various cutters may be of different diameters as for instance new cutters, and old cutters which have been ground many times which naturally reduces their diameter. A separate adjusting screw 101 is provided for each carrier and mounted in a bracket 102 secured to the end of the saddle. The adjusting screw extends through a fixed nut in its respective carrier whereby rotation of the screw will effect lateral movement of the carrier. As shown in the drawings two of these screws may be mounted upon one end of the means to individually adjust the spindles on the saddle in two directions relative to the plane of the table.

3. A milling machine having a bed, a table reciprocably mounted upon the bed, a column, a horizontal rail projecting from the column having guideways formed thereon, a saddle reciprocably mounted on said guideways transversely of the table, a plurality of spindle carriers mounted upon the saddle, means to adjust said spindle carriers relative to the saddle, cutter arbors mounted in each carrier and individual arbor supports mounted on the saddle for supporting the free ends of said arbors.

4. A milling machine having a bed, a work support reciprocably mounted on the bed, a rail extending horizontally over the work support, a saddle reciprocably mounted upon the rail, a plurality of spindle carriers mounted on the saddle, a cutter spindle journaled in each carrier, a cutter arbor attached to each spindle and depending toward the work support, a cutter mounted on each arbor, and means to support the free end of said arbors including a plurality of arbor supports attached to the underside of the saddle for movement therewith and each having a bearing for engaging the free end of an arbor.

5. A milling machine having a bed, a table reciprocably mounted upon the bed, a rail projecting horizontally over the table, a saddle reciprocably mounted upon the rail, a plurality of spindle carriers mounted on the saddle, a cutter spindle journaled in each carrier, individual means for adjusting each carrier on the saddle, means to adjust the saddle on the rail, a drive shaft for said spindles journaled in the rail and means to maintain a driving connection between the drive shaft and spindles during both of the adjusting movements.

6. A milling machine having a bed, a table reciprocably mounted upon the bed, a column, a rail projecting horizontally from the column over the table, a saddle reciprocably mounted upon the rail, a plurality of spindle carriers mounted on the saddle, means to adjust the spindle carriers on the saddle relative to each other, means to adjust the saddle longitudinally of the rail, a drive shaft for the spindles journaled in the rail, a prime mover carried by the rail, change speed gearing coupling the prime mover to said shaft whereby the rate of rotation of the shaft and thereby the spindles may be varied and means to couple the shaft in power transmitting relationship with the cutter spindles in all positions of adjustment thereof.

7. A milling machine having a bed, an hydraulically actuated table reciprocably mounted upon the bed, a plurality of cutter spindles associated with said table, a multiple work holder mounted on the table including a plurality of work receiving spindles, means actuable upon advancing movement of the table to rotate said work spindles including a final drive shaft and means to disconnect the final drive shaft from said actuating means to effect manual rotation of the work holders for adjustment purposes.

8. A milling machine having a support, a power reciprocated table mounted upon the support, rotary cutter means associated with the table, a rotary work receiving chuck mounted on the table for movement therewith relative to the cutter means, a drive shaft for effecting rotation of the work chuck, means actuable upon movement of the table in one direction to translate rectilinear movement of the table into rotary motion to rotate said drive shaft, additional means actuable by movement of the table in the other direction to actuate said drive shaft, means to alternately couple each of said drive means with the shaft during a reciprocation of the table and means to disconnect both of said power means from the shaft to effect manual rotation of the same.

9. A milling machine having a bed, a table reciprocably mounted on the bed and having a horizontal work receiving surface, a rail supported in spaced relation to the table and extending parallel to said surface, a saddle reciprocably mounted on the rail, a plurality of cutter spindles supported on the saddle with their axes intersecting said work receiving surface at an acute angle thereto, cutters mounted on the spindle with their cutting planes coincident, means to support a plurality of work pieces in spaced relation and in a plane parallel to said surface, means to traverse the table to effect engagement between the cutter and work, and means to translate said saddle relative to the rail to disengage simultaneously all of said cutters from the work upon completion of the cutting stroke.

10. A milling machine having a bed, a table having a horizontal work receiving surface reciprocably mounted on the bed, a column, a rail supported by the column in spaced relation to the table having guideways thereon parallel to said surface, a saddle reciprocably mounted on the rail, a plurality of cutter spindles supported on the saddle with their axes intersecting the table at an acute angle, cutters secured to the spindle for rotation in coincident cutting planes, means to support a plurality of work pieces on said table in a plane parallel to the surface thereof, means to adjust the spindles axially and laterally to align the cutters with respective work pieces, power means for reciprocating the table to bring the cutters into engagement with the work, and power means to reciprocate the saddle to disengage simultaneously all of said cutters from the work upon completion of the cutting operation.

11. A milling machine having a bed, a table reciprocably mounted upon the bed, a column, a horizontal rail projecting from the column having guideways formed thereon, a saddle reciprocably mounted on said guideways for movement transversely of the table, a plurality of spindle carriers mounted on the saddle, each spindle having a cutter for engaging a respective work piece carried by the table, hydraulic means to effect relative movement between the cutters and work including a piston and cylinder, hydraulically actuated means to effect separation of the cutters from the work at completion of the cutting operation including a piston and cylinder, a feed screw and nut one of which is connected to the saddle and the other to the rail, means to effect relative rotation between the screw and nut including a rack and pinion, and means coupling the rack to said piston, and means connecting the cylinders in parallel for joint control by the table.

12. A milling machine having a table, a plurality of cutter spindles mounted in cooperative relation to the table, cutters mounted on said spindles for rotation thereby, a multiple work holder carried by the table including a plurality of rotatable work receiving chucks, a common drive shaft for said chucks, mechanism operable upon movement of the table in one direction to effect constant rotation of the chucks and thereby a spiral cutting path between the cutters and work, additional mechanism operable upon return movement of the table to effect indexing of the work, means automatically operable upon reversals in table movement to connect the mechanisms alternately to said shaft, a manual actuator for the shaft, and means to simultaneously disconnect both of said mechanisms from the shaft to permit manual operation thereof independent of said mechanism.

13. A milling machine having a bed, a table reciprocably mounted upon the bed, a column, a horizontal rail projecting from the column having guideways formed thereon, a saddle reciprocably mounted on said guideways, a plurality of spindle carriers adjustably mounted upon the saddle, a cutter spindle journaled in each carrier and individual means to adjust the spindle carriers including separate adjusting screws journaled in the saddle engaging fixed nuts formed in the respective spindle carriers.

14. In a milling machine having a cutter support, a cutter spindle rotatably journaled in said support and a work support movable transversely to the axis of the spindle, the combination of a fluid operable device for effecting reciprocation of the work support, a second fluid operable device for effecting adjustment of the cutter support transversely to the direction of movement of the work support, a first pair of delivery channels extending to the respective devices, a source of pressure, a control valve for coupling pressure to said channels to effect movement of the supports in one direction along their respective paths of movement and a second pair of channels connected to the respective devices and couplable by the valve to said source of pressure for effecting movement of the supports in a second direction along their respective paths of movement.

15. In a milling machine having a rotatable tool support and a work support movable in a path transversely to the axis of the tool support, the combination of a fluid operable device for effecting movement of the work support, a second fluid operable device for effecting adjustment of the tool support in a direction transverse to the direction of work support movement, a fluid pump, a first and second pair of delivery channels, one channel of each pair being connected to one of said devices and the other channel of each pair being connected to the other device, and means to connect the pump to the first pair of channels to effect movement of each support in one direction along their respective paths of movement or to connect the pump to the other pair of channels to effect reverse movement of said supports.

16. A milling machine having a support, a spindle carrier mounted on the support, a tool spindle journaled in the carrier, a power transmission for effecting continuous rotation of the spindle, a work table mounted on the support and relatively movable in one direction with respect to the spindle carrier, fluid operable means for effecting said relative movement, additional fluid operable means for effecting relative movement between the cutter spindle and work support in a second direction, a source of fluid pressure, a control valve having a first position for coupling pressure to said devices to effect movement in one direction along both paths of movement, means trip operable by one of the movable parts for moving the control valve to a second position, and means in the valve for coupling the pressure to said devices in a manner to reverse the direction of movement of both movable parts in their respective paths of movement.

17. In a milling machine having a cutter support and a work support, said supports being relatively movable along two angularly related paths, separate fluid operable devices for effecting movement in each path, a source of fluid pressure, a first pair of channels connected to the respective devices, a control valve for coupling pressure to said channels to effect relative movement of said supports along both paths of movement, a second pair of channels connected to the respective devices and couplable by the control valve to pressure for effecting reverse movement of said supports along both paths of movement, and a stop valve interposed between the control valve and said devices and operable at will to stop movement along any of said paths.

18. In a milling machine having a work support, a cutter support, a pair of fluid operable devices for effecting relative movement between the supports along two angularly related paths, said cutter support having a plurality of spindles journaled therein, power means for effecting continuous rotation of the spindles, a source of fluid pressure, a control valve having a first position for coupling pressure to said devices in a manner to effect movement in one direction along each of said paths, trip means operable by one of said supports for shifting the valve to a second position whereby to simultaneously change the direction of relative movement of the supports along each path of movement and a stop valve interposed between the control valve and said devices and operable at will to stop all movement.

19. In a milling machine having a cutter support and a work support, separate fluid operable devices for effecting relative movement between said supports along angularly related paths, a source of pressure, a control valve movable to a first position for coupling pressure to said devices in a manner to cause relative movement of the supports in one direction along each path of movement, one of said supports having greater resistance to movement than the other whereby one will complete its movement before the other starts, said control valve being movable to a second position to effect reverse relative movement between the parts along said paths of movement.

20. A milling machine having a work support, a cutter support, means for effecting relative movement between the supports along two angularly related paths including separate fluid operable devices for effecting movement along each path, a positive stop for limiting movement along one of said paths and thereby determine the depth of cut, a source of fluid pressure, a control valve for coupling pressure to said device to effect movement in one direction along the respective paths, and trip operable means for shifting said valve to cause reverse movement along said path.

MILLARD ROMAINE.
ERWIN G. ROEHM.